(No Model.) 7 Sheets—Sheet 1.

W. J. RIGNEY.
FARE REGISTER.

No. 367,930. Patented Aug. 9, 1887.

Attest:
G. B. Nash,
H. B. Knight.

Inventor:
Wm. J. Rigney.
By E. B. Whitmore, Atty.

(No Model.)  7 Sheets—Sheet 3.

W. J. RIGNEY.
FARE REGISTER.

No. 367,930. Patented Aug. 9, 1887.

Attest:
C. B. Nash,
H. B. Knight.

Inventor:
Wm J. Rigney.
By C. B. Whitmore, Atty.

(No Model.) 7 Sheets—Sheet 4.

W. J. RIGNEY.
FARE REGISTER.

No. 367,930. Patented Aug. 9, 1887.

Fig. 4.

Attest:
C. B. Nash.
H. B. Knight.

Inventor:
Wm. J. Rigney.
By E. B. Whitmore, Atty.

(No Model.) 7 Sheets—Sheet 5.

W. J. RIGNEY.
FARE REGISTER.

No. 367,930. Patented Aug. 9, 1887.

Attest:
C. B. Nash,
H. B. Knight.

Inventor:
Wm. J. Rigney
By E. B. Whitmore,
Atty.

(No Model.) 7 Sheets—Sheet 6.

W. J. RIGNEY.
FARE REGISTER.

No. 367,930. Patented Aug. 9, 1887.

Fig. 8.

Attest:
C. B. Aash.
N. B. Knight.

Inventor:
Wm J. Rigney,
By E. B. Whitmore, Atty.

(No Model.) 7 Sheets—Sheet 7.

W. J. RIGNEY.
FARE REGISTER.

No. 367,930. Patented Aug. 9, 1887.

Attest:
C. B. Nash,
H. B. Knight

Inventor:
Wm. J. Rigney,
By E. B. Whitmore, Atty.

UNITED STATES PATENT OFFICE.

WILLIAM J. RIGNEY, OF ROCHESTER, NEW YORK.

FARE-REGISTER.

SPECIFICATION forming part of Letters Patent No. 367,930, dated August 9, 1887.

Application filed July 9, 1886. Serial No. 207,530. (No model.)

*To all whom it may concern:*

Be it known that I, WILLIAM J. RIGNEY, of Rochester, in the county of Monroe and State of New York, have invented a new and useful Improvement in Registers for Passenger-Fares, which improvement is fully set forth in the following specification, and shown in the accompanying drawings.

The object of my invention is to produce an improved registering device for passenger-fares which shall indicate the direction, "Up," "Down," "East," "West," &c., of each trip made by the car, and register the fares paid during each such trip, adding thereto a locking device which shall prevent the registering of any fare or ringing the alarm until the primary registering-wheels are brought truly back to zero at the end of each trip made by the car, the invention being fully described hereinbelow, and more particularly pointed out in the claims.

Referring to the drawings, Fig. 4, a view of some of the parts of the device seen from the same point from which Fig. 1 is seen, parts fully shown in other figures being represented in this figure in dotted lines, the case being sectioned as on the dotted line $y^3$ in Fig. 2; Fig. 9, a side elevation of one of the secondary registering-wheels viewed in the direction indicated by arrow $x$ in Fig. 1, parts being shown in two positions by full and dotted lines, the figure being drawn to a much smaller scale than that to which Fig. 1 is drawn; Fig. 15, a view of a part of the trip mechanism seen in an opposite direction from that in which Fig. 12 is seen, the plate being vertically sectioned as upon the dotted line $y^4$ in Fig. 4, and viewed as indicated by the arrow pointed thereon; and Fig. 16, an enlarged view of a part of the wheel shown in full in Fig. 9, with some of the associated parts drawn to more fully show the relation between the short pin and the revolving arm that passes it.

I show the device as being composed of two independent sets or systems of registering-wheels, with a gong and striking mechanism and an actuator for each, said systems being alike and designed for the purpose of registering different grades of fare—as, for instance, five-cent fares and three-cent fares—some of the parts of the device acting upon the registering-wheels being common to both systems.

Referring to the parts, A is the case or inclosure for the parts, being preferably made of sheet metal, excepting the back plate, B, which I make of cast-iron, the same constituting a rigid base or frame-work for the device, and the front plate, K, of glass.

C are two parallel standards forming a part of the frame-work, secured rigidly to the back plate, serving to hold the core or shaft I', upon which all of the registering-wheels turn, together with other parts of the device.

D are parallel longitudinal bolts passing through openings $a$ in the standards and the parts of the core, which bolts serve to hold said parts of the core rigidly together and to the frame, said core being made up of sections.

E is the bell and F the operator for the right-hand system of registering-wheels, and H' a similar bell, and G a similar operator for the left-hand system of registering-wheels.

H is a shaft held by the standards in a position parallel with the core, said shaft being provided with fingers or projections $m\ l\ n\ k\ g$, for resetting the primary registering-wheels of both systems and changing other parts to bring into view the words "Up" or "Down," "East" or "West," or others at the face of the device when required.

I is a face-plate rigid with the standards C, just back of and parallel with the glass K of the case, it being perforated at various points to expose to view parts of the faces of the registering-wheels of both systems, and the direction-plate indicating the direction of the trip taken by the car during any given run. The glass K is held by the case A, so that by looking through it the register may be read.

C' is a wheel fitted to turn upon the core I', Figs. 1, 3, 4, 6, 7, and 8, and placed to separate the right and left hand systems of registering-wheels, said wheel being used to set the direction-plate to indicate the direction of the trips taken by the car.

Figure 1:
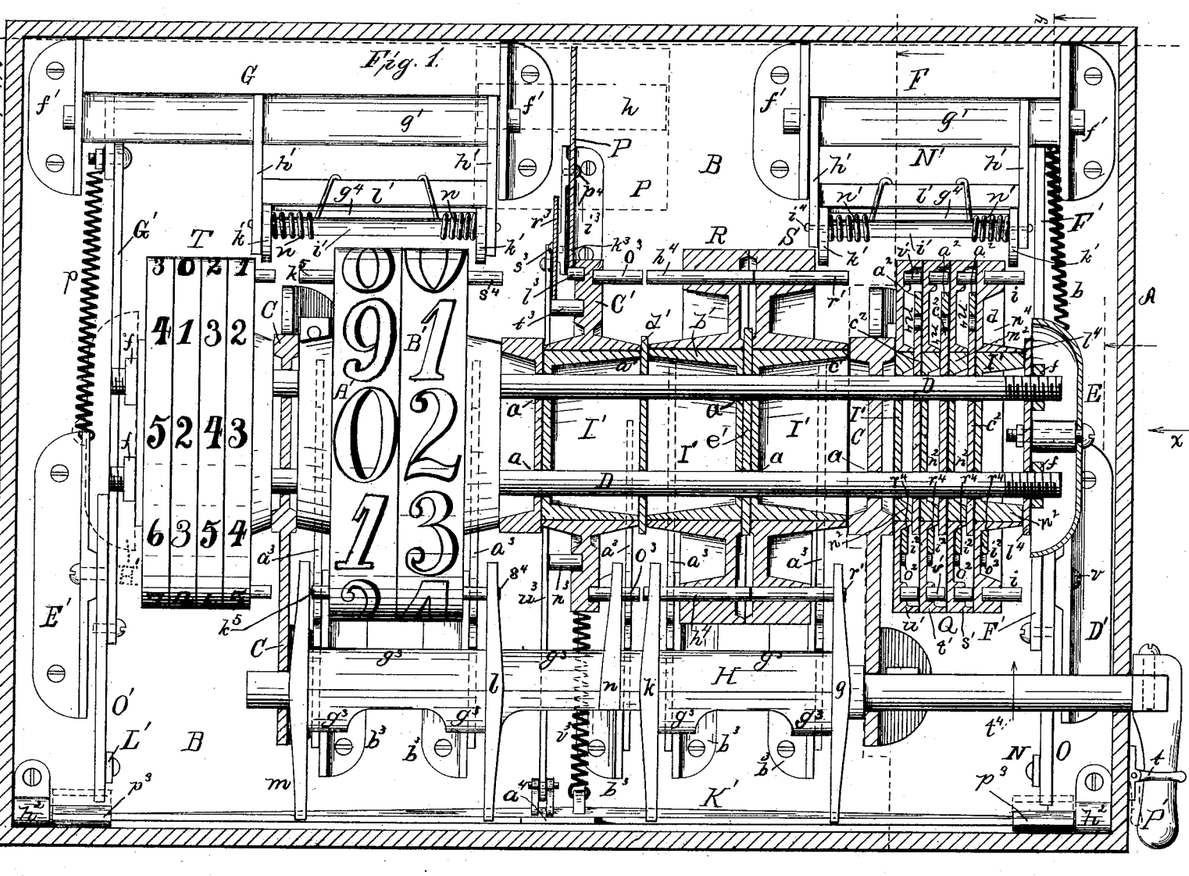
Figure 1 is a vertical longitudinal section of the case of the device taken as upon the dotted line $x^2$ in Fig. 2, seen from a position in front of the device as indicated by arrow $x'$, some of the contained parts being sectioned by the same plane.
Figure 2:
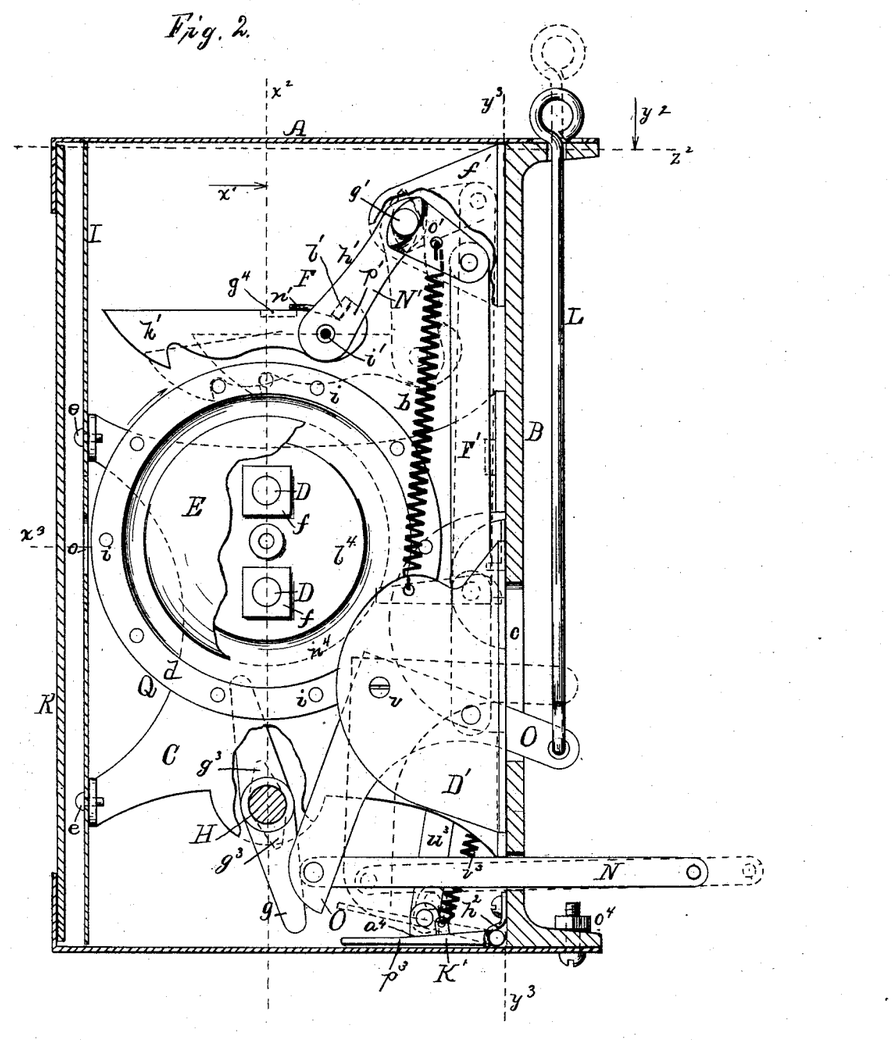
Fig. 2, a view of the same seen as indicated by arrow $x$ in Fig. 1, the case being sectioned as upon the dotted line $y$, parts being broken away and other parts shown in two positions by full and dotted lines.
Figure 3:
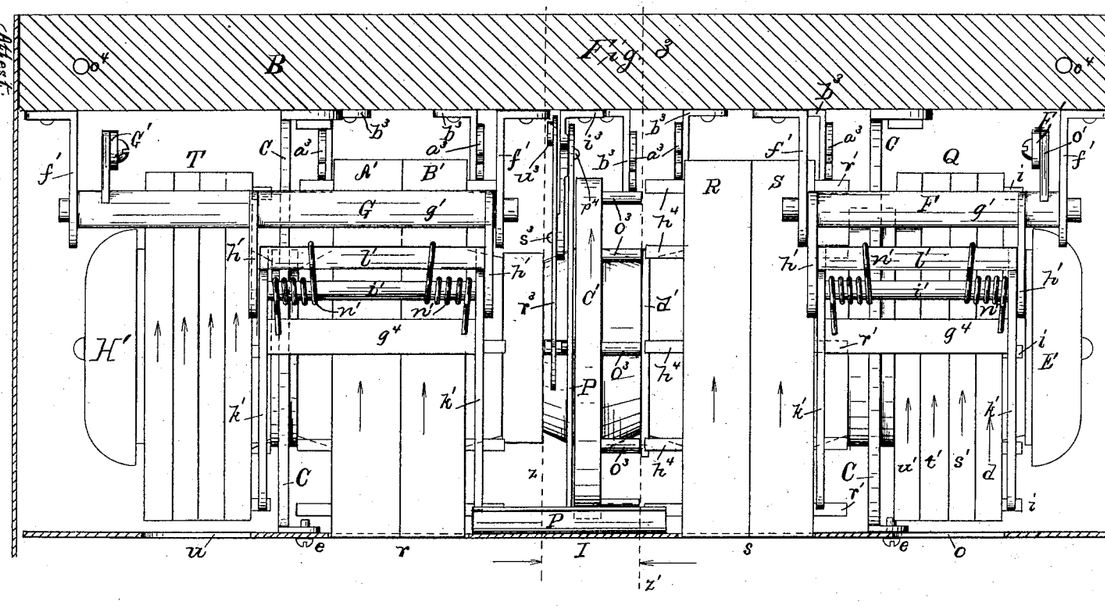
Fig. 3, a top view of the same seen as indicated by arrow $y^2$ in Fig. 2, the case being horizontally sectioned as on the dotted line $z^2$ in said figure, and the face-plate sectioned on the (.........) dotted line $x^3$ therein.
Figure 6:
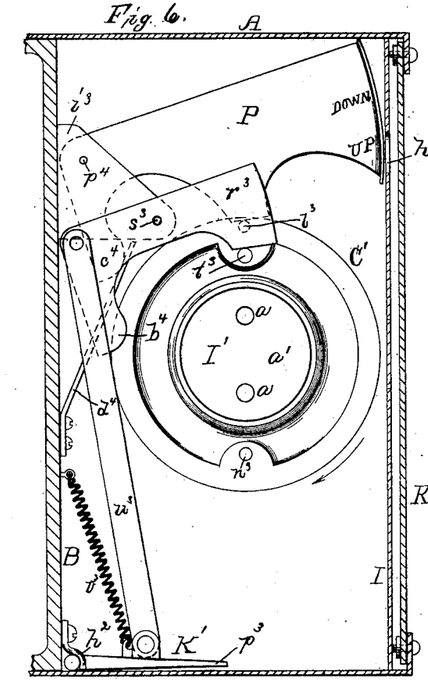
Fig. 6, a side elevation of the mechanism for indicating the trip or run made by the vehicle, whether up or down, east or west, &c., the case being transversely-vertically sectioned as upon the dotted line $z$ in Fig. 3, and viewed as indicated by the arrow pointed thereon, the scale being larger than that of Fig. 5.

K', Figs. 1, 2, and 6, is a locking device, which, when required, serves to prevent the registering of fares.

O, Figs. 1 and 2, is a bell crank or lever near the lower rear part of the case, held upon a pin, $v$, of a bracket, D', to swing in a vertical plane, with one arm extending out through a slot, $c$, formed in the plate B. To the respective arms of this lever pull-rods L and N are attached, the former reaching upward to receive the end of a bell-cord extending through the car, and the latter reaching out through the end of the car to be operated conveniently from the platform, the register being placed against the inner end of the car. From the lever a connecting-bar, F', reaches up to and is connected with the operator F, so that a movement of said lever by either of the pull-rods causes said operator to turn the registering-wheels. The left-hand system of registering-wheels is likewise provided with a bell-crank lever, O', bracket E', connecting-bar G', and pull-rod L', and a vertical pull-rod like the one at L. (Not shown.)

The core or shaft I', upon which the registering-wheels turn, is comparatively large in diameter and made up of cylindrical sections $a'$, $b'$, $c'$, and $n^2$, placed end to end, excepting that they are separated by thin plates $d'$, $e'$, and $c^2$, all of which plates, excepting the first named, have their edges formed into cams, the use of which will be explained farther on. The tie-bolts D pass snugly through all of the said sections and separating plates or cams, together with the standards C, and are threaded at their ends to receive binding-nuts $f$, to bind the whole firmly together.

The operator for each system of registering-wheels—as, for instance, that shown at F—consists of a rigid frame, N', held to turn in bearings $f'$, extending out from the plate B, said frame having parallel side pieces, $h'$, rigidly joined by bars $l'$ and $g'$. To the extreme ends of these side pieces or sides parallel hooked arms $k'$ are secured to turn in vertical planes, said arms being rigid with a cross rod or tube, $i'$, into the ends of which pivot-pins $i^1$ are inserted for said arms to turn upon. The hooked arms are preferably further strengthened by a cross-bar, $g'$, and coiled springs $n'$ upon the tube $i'$ have their ends respectively resting upon the bar $l'$ of the frame N' and said bar $g'$, the springs being strained, so that their tendency is to urge the free ends of the hooked arms downward, for a purpose fully stated farther on. The frame N' is provided with a short rigid arm, $o'$, to which the connecting-bar F' is attached to move the operator F to turn the registering-wheels. A spiral spring, $b$, joining said arm $o'$ and the bracket or hanger D', serves to pull the arm $o'$ downward to raise the hooks off of the wheel.

The outer registering units wheel $d$ of the series Q is provided with ten pins, $i$, equally spaced, reaching out from the side thereof equidistant from and parallel with the axis of the wheel, and the operator F is placed so that one of the hooks $k'$ rests over said pins in position to act thereon when moved by a pull-rod, N or L. The primary registering units-wheel S, larger in diameter and broader upon the face than the wheel $d$, is similarly provided with pins $r'$, in position to be acted upon by the other hook $k'$. The hooks $k'$ are further formed with parts $p'$, projecting back of the bar $l'$, which, encountering said bar, form a stop for the downward movement of the free ends of said hooks, serving to hold the latter normally away from the pins of the registering-wheels, as shown in Fig. 2, to permit the wheel S to be turned backward when necessary. When the arm $o'$ of the operator is pushed upward from either of the pull-rods being pulled, the hooks thereof are brought down onto their respective pins, as indicated by dotted lines in Fig. 2, and the units-wheels $d$ and S will be turned to the amount of one-tenth of a complete revolution, which raises the registered number to the amount of 1, as appearing through both of the openings $s$ and $o$ in the face-plate I, above mentioned. When the pull-rod is released, the spring $b$ draws the arm $o'$ down and raises the hooks, as above mentioned, off the pins.

The wheels $d$, $s'$, $t'$, and $u'$ of the series Q are of the same breadth of face, and are substantially alike, the face of each being provided with the numerals from 0 to 9, inclusive, equally spaced therearound, so that said wheels may together show through the space $o$ in the face-plate any number from 0 to 9999, inclusive. The primary or trip wheels S and R are also alike, having the numerals from 0 to 9, inclusive, upon their respective faces, said wheels together showing, through the opening $s$, any number from 0 to 99, inclusive. The wheels $d$, $s'$, $t'$, and $u'$ are so connected and related to each other that a complete revolution of either one of the first three serves to turn the next one to the left through a one-tenth part of a revolution, on account of which, by turning the right-hand wheel $d$ indefinitely one space at a time, starting from zero, the successive numbers from 0 up to any number not exceeding 9999 will appear at the opening. The wheel S is likewise connected with the wheel R, so that one complete revolution of the former turns the latter one-tenth of the way around, so that a continuous turning of said wheel S one space or pin at a time, commencing with zero, will show successively all the numbers up to 99 through the opening $s$. The operator F acts upon the pins of said units-wheels $d$ and S to turn each simultaneously one space at a time—that is to say, through one-tenth of a revolution at each movement thereof—thus bringing into view at two places upon the face of the device a number corresponding to the number of times a pull-rod has been pulled up to any given time within the respected limits stated.

Figure 5:
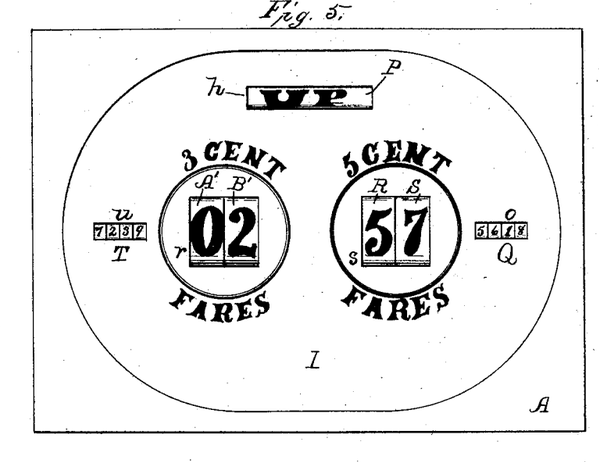
Fig. 5, a front elevation of the device drawn to show on a smaller scale the relative arrangement of the openings in the face-plate and the various registering-wheels and other parts.

The trip-wheels S and R are designed to register the number of fares paid during any given trip, and to be returned or set back to zero at the end of such trip, while the series of continuous registering-wheels Q are not turned back at any time, but register in succession all of the fares paid up to ten thousand. When these latter wheels are brought to a position in which four figures 9 appear at $o$, Fig. 5, the next pull upon the wheel $d$ moves all one space, so that four 0s appear, indicating that ten thousand fares have been paid, and the wheels are then ready to begin registering another ten thousand.

Figures 10, 11:
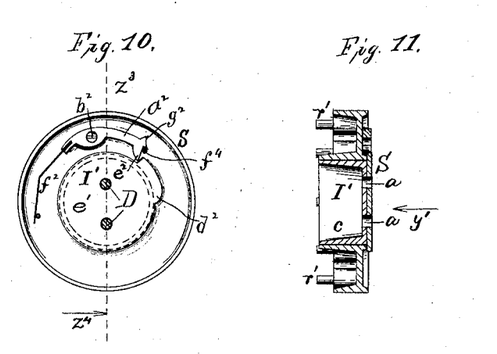
Fig. 10, a view of the reverse side of said wheel seen as indicated by arrow $y'$ in Fig. 11.
Fig. 11, a diametrical longitudinal section of the wheel taken as on the dotted line $z^3$, and viewed as indicated by the arrow $z^4$.
Figure 13:
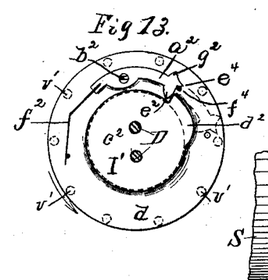
Fig. 13 shows the opposite side of the wheel shown in Fig. 12, drawn to show the form of the cam and pawl, which are the same as shown in Fig. 10.

The construction by which one wheel moves another in the manner above described is shown in Figs. 10 and 13. It will be seen that one side of each of the wheels $d$ $s'$ $t'$ $u'$ of the series Q is straight or plain, while the opposite side of each is formed with an annular recess, $u^4$, leaving a space between each two adjacent wheels when put together, as shown in Fig. 1. Each wheel $s'$, $t'$, and $u'$ is also provided with a series of ten short pins, $v'$, within the respective spaces above mentioned, between said wheels, these pins, like the pins $i$ of the wheel $d$, being equally spaced. A pawl, $a^2$, Figs. 10 and 13, is secured to the plain side of each of the wheels $d$, $s'$, and $t'$ by a stud, $b^2$, in position, when it is raised, to catch one of the short pins $v'$ of the adjacent wheels. A cam, $c^2$, for each pawl, is placed between the hubs of each of the adjacent wheels, said cams being rigid with the core I', and held by the bolts D, each of said cams being circular, excepting as to a peripheral projection, $d^2$, as shown. As a wheel having a pawl attached is carried around, the point $e^2$ of the pawl moves around close to the periphery of the cam, being held down by a spring, $f^2$, and while in that position its upper point, $g^2$, passes within or under the pins $v'$ of the next wheel, so that no motion is given said wheel; but as the point $e^2$ of the pawl moves over the enlarged part $d^2$ of the cam $c^2$ the upper point, $g^2$, is raised sufficiently to catch a pin, $v'$, and carry said adjacent wheel around one-tenth of a revolution, the part $d^2$ being of such length as to allow the pawl to be carried down by the spring, and disengage the pin after said wheel has been turned one-tenth around. After passing the part $d^2$ the pawl is carried down by the spring to its normal position to pass under the pins $v'$, until the wheel to which it is attached makes another revolution. To further explain, let the wheels of the series Q be in such positions that the points $e^2$ of the respective pawls $a^2$ shall rest upon the edges of the cams at the bases of the enlarged parts $d^2$ of each, in which positions the naughts of the wheels will be exposed to view through the opening $o$. Then if the pull-rod be pulled once it will turn the units-wheel $d$ so that the figure 1 will appear at the opening, and if pulled twice the figure 2 will appear, the pawl of said wheel receding from the part $d^2$ at each motion of the wheel. A third pull will present the figure 3, and so on till the figure 9 is presented to view, in which position of the wheel the point $e^2$ of the pawl will have arrived at the other end of the part $d^2$, as shown in dotted position in Fig. 13, ready to rise over the latter and catch a pin, $v'$, of the wheel $s'$, as above described, at the next motion of the wheel $d$, resulting from the tenth pull upon the pull-rod. The tenth pull will return the wheel $d$ to the position from which it started, causing it to show the naught again, while the wheel $s'$ will be advanced one space, bringing the figure 1 upon its periphery into view, and at the left of the naught appearing on the wheel $d$, indicating that ten fares have been registered. Carrying the wheel $d$ around again in the same manner by successive pulls upon the pull-rod will cause it to again present the naught to view and at the same time advance the wheel $s'$, as before, one space, bringing the figure 2 into view thereon and presenting the number 20 as the number of fares registered. Similarly, when ninety-nine fares have been paid and registered, the pawls $a^2$ of both the wheels $d$ and $s'$ will be at the positions shown in dotted lines, above mentioned—that is to say, ready to move over the respective raised parts $d^2$ of the cams $c^2$, and the next pull will turn simultaneously all three of the wheels $d$, $s'$, and $t'$ through one space, causing the figure 1 of the latter wheel to appear with the naughts of the other wheels, $d$ and $s'$, indicating that one hundred fares have been registered. Similarly, when nine hundred and ninety-nine fares have been registered, the respective pawls of the three wheels $d$, $s'$, and $t'$ will occupy the positions above-mentioned with respect to the raised parts $d^2$ of the respective cams $c^2$, when another pull upon the pull-rod will turn all four of the wheels of the series Q, through one space, causing 1,000 to appear at the opening $o$ as the number of fares registered; and when nine thousand nine hundred and ninety-nine fares have been thus registered another pull upon the rod will turn all of said wheels through a single space, causing a series of four naughts to appear, which will indicate that ten thousand fares have been registered, and the whole series will be in position to start out on the second ten thousand. Of course a greater or less number of wheels than four may be employed in the series.

The pawls $a^2$ are formed with projections $c^1$ to catch upon pins $f^1$, secured to the respective wheels, the function of which pins is to hold the weight of the pawls off the circular portions of the cams to prevent wear between said pawls and cams from friction caused by the pressure of the spring.

The primary tens-wheel R is operated by the wheel S by a pawl and cam of the same kind as those used in the series Q, just mentioned, the same being shown in Fig. 10. The hooks $k'$ $k'$ of the operator F act simultaneously upon the pins of the respective wheels $d$ and S, so that each fare paid is registered at once by both the trip-wheels and by the wheels of the series Q, as described.

Figure 12:
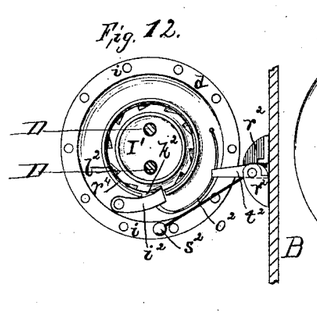
Fig. 12, a side elevation of the registering-wheel appearing at the extreme right in Fig. 1, showing the trip mechanism for striking the bell, the figure being drawn to a smaller scale and seen in the direction indicated by arrow $x$ in said Fig. 1, the base-plate being sectioned, as upon the dotted line $x^4$ in Fig. 4, and viewed as indicated by arrow pointed thereon.
Figure 14:
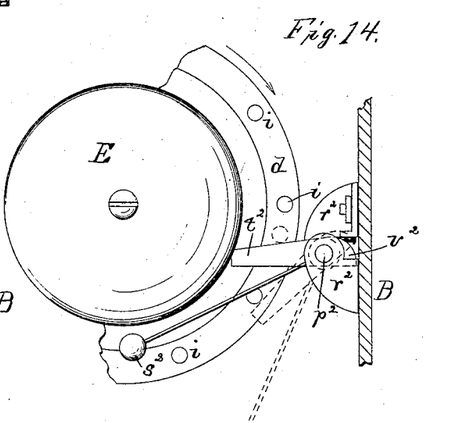
Fig. 14, drawn to a larger scale, is a similar view to that of Fig. 12, part of the wheel being broken away and the bell shown in place.
Figure 15:
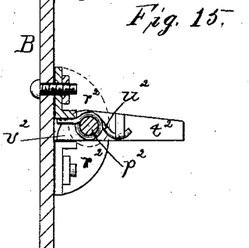

Besides the advancing pawls $a^2$ of the wheels of the series Q, each of said wheels is provided with a simple retaining-pawl, $i^2$, Figs. 1 and 12, held in the respective annular depressions $n^1$ of the wheels, the points of which pawls pass through openings $k^2$ in the hubs $r^1$ of the wheels and enter notches $l^2$ in the rigid parts $n^2$ of the core upon which said wheels turn. These pawls are held against the respective parts $n^2$ by simple springs $o^2$, in the usual manner. The notches $l^2$ are ten in number for each wheel, and so arranged that when either wheel is advanced a space by the pull-rod to register a fare the point of the pawl will drop therein, and so prevent the wheel being turned backward from the jar of the car or otherwise. The pins $i$ of the wheel $d$ serve also to strike the bell each time a fare is registered by the following means:

$p^2$ is a shaft held in bearings $r^2$, secured to the plate B, back of and parallel with the axis of the series of wheels Q, said shaft being provided with a bell-hammer, $s^2$, in position to strike the bell E, which is of common kind. The shaft is further provided with a rigid arm, $t^2$, in position to be acted upon by the pins $i$, which latter, as they press the lever, carry the hammer back from the bell, as indicated in dotted lines in Fig. 14. A spring, $u^2$, secured to said shaft and coiled therearound, serves to throw the hammer forward against the bell, in substantially the usual manner, after a pin has passed by the backwardly-pressed lever $t^2$. The end $v^2$ of the lever meets a part of the bearing $r^2$ to form a stop for the motion given said lever by the spring, it being stopped in such position that the hammer just clears the bell. The bell and striking mechanism, therefore, are not held to be new.

The system of wheels at the left, composed of the series T, corresponding to the series Q, and the wheels A' and B', corresponding, respectively, to the wheel R and S, as shown on Sheet 1, operates in exactly the same manner to register fares, being turned by the operator G, the two independent systems being convenient to register different grades of fare, as above stated. The bell H' of said system is struck in a similar manner.

Figure 4:
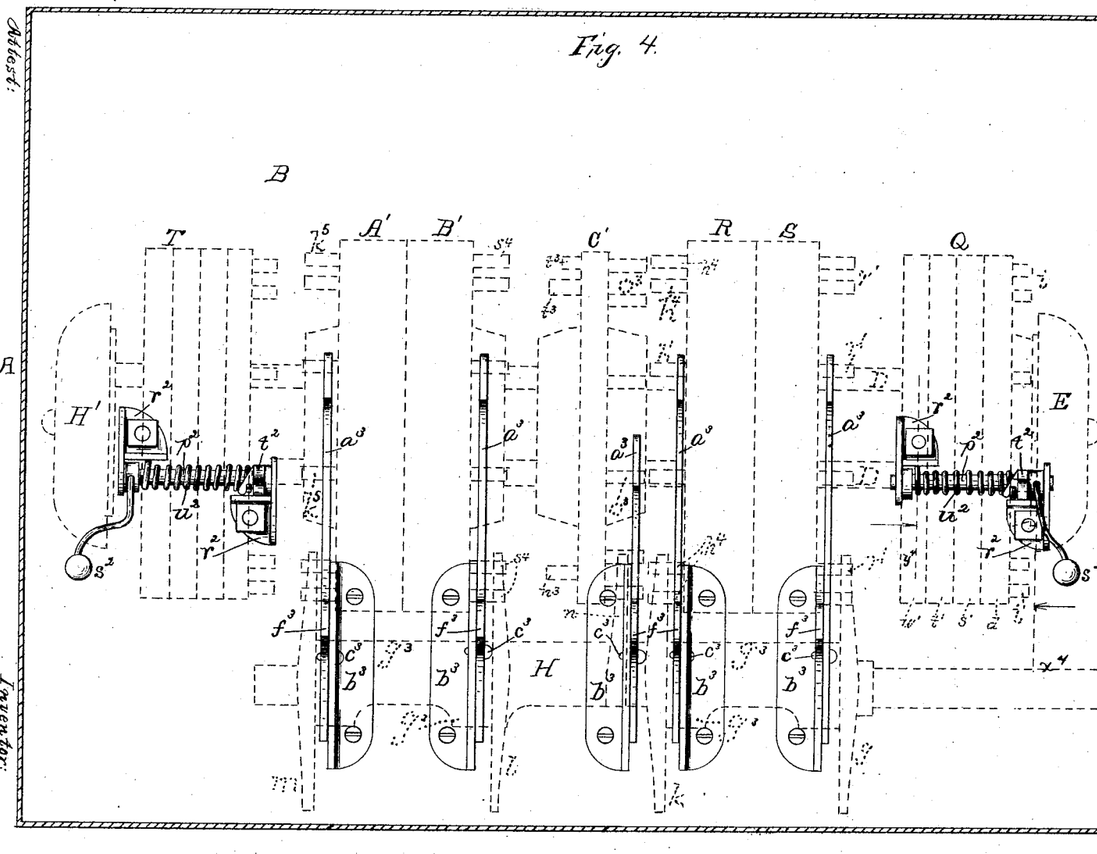
Figure 8:
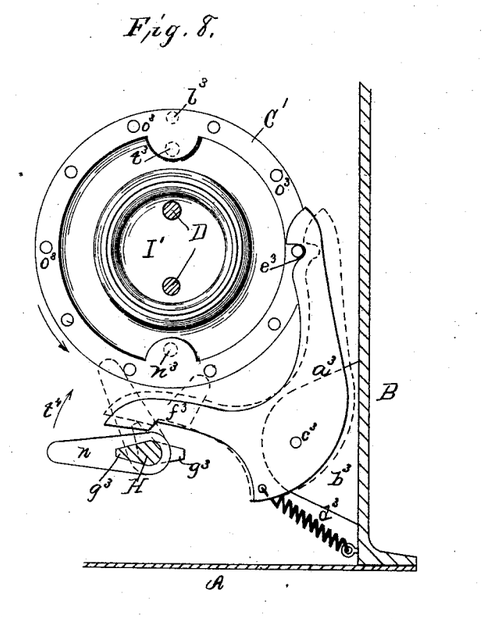
Fig. 8 shows a part of the mechanism for bringing into view the words "Up," "Down," &c., a detent for the wheel being shown, the case being sectioned as upon the dotted line $z'$ in Fig. 3, and viewed as indicated by the arrow pointed thereon, parts being shown in two positions by full and dotted lines.
Figure 9:
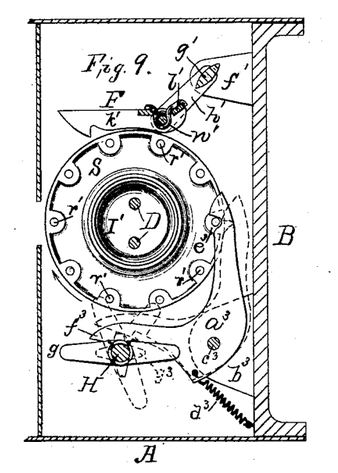

The trip-registering wheels of both systems are provided with exterior catch-pawls, $a^3$, Figs. 4, 8, and 9, to catch onto the pins to keep said wheels from being turned either way from the jar of the car or other undesigned cause, the function of said pawls being substantially the same as that of the pawls $i^2$, above described. These pawls are held by brackets $b^3$, secured rigidly to the plate B, said pawls being fitted to turn on pivot-pins $c^3$, secured thereto. Each pawl has a spring, $d^3$, acting to hold the pawls against the pin. I prefer to make the notches $e^3$ in the pawls substantially in the form shown—that is to say, so that the wheel will be held positively from turning backward and moderately resisted in its forward motions. These pawls are each formed with a shank, $f^3$, reaching forward over the shaft H, the latter being formed with oppositely-projecting parts $g^3$, Figs. 1, 2, 4, 8, and 9, which, when said shaft is turned, encounter said shanks of the pawls, causing the latter to temporarily release the pins when the wheels are being turned backward to zero, which turning backward is also accomplished by rotating said shaft, as described farther on. This shaft H is further provided with laterally-projecting fingers $l$, $m$, $k$, and $g$ in the plane of the projections $g^3$, said fingers being in position and of the proper length to encounter the pins $s^1$ $k^5$ $h^1$ $r'$ of the respective trip-wheels of both systems as said shaft is rotated. By turning the shaft in the direction indicated by arrow $t^1$, Figs. 1 and 8, the pins of said wheels will be successively pushed back by said fingers, causing the wheels to turn backward, as stated, the parts being so arranged that a pin is being pushed back by one of the fingers at the same time the catch-pawl is lifted off its pin to release the wheel by the action of a projection, $g^3$, of the shaft, as stated. The shaft is preferably turned in its bearings by a crank, P', secured to the end thereof, said end projecting through the end of the case, as shown.

Regarding the left-hand hooked arm $k'$ of the operator F, as shown in Fig. 1, and the opposing finger $g$ of the shaft H, it will be seen that said finger $g$ acts upon the pins $r'$ near their outer ends, while said hooked arm acts upon the pins near the side of the wheel, so that one pin, for instance, may be made so short that it will not be encountered by the finger $g$, and still be of sufficient length to be acted upon by said hooked arm, the same as the rest of the ten are acted upon. For instance, regarding Fig. 9, if the pin nearest the shaft H were made so short that the finger $g$ passed it without touching, no motion would be given the wheel S from turning the shaft H, while said short pin was presented to the finger. A pin of each wheel is thus purposely made short, it being in each case the pin passed by the finger when the zero-mark of the wheel is opposite the opening in the face-plate I. This short pin is necessary in setting the wheels back to zero. For instance, if seventy-two fares were registered during a given trip, then in setting the trip-wheels back to zero the units-wheel would have to be turned back two spaces, or have its pins encountered twice by the fingers of the shaft H, while the tens-wheel could not be set back by less than seven operations of the fingers upon its pins. Then by turning the shaft H the short pin of the units-wheel would be presented to the fingers after one revolution of the shaft, which latter would then become inoperative as regards said units-wheel, which would not be farther turned or affected by the subsequent rotations of the shaft necessary to bring the tens-wheel back to zero. Either wheel of a pair being thus in advance of the other will, in making the retrograde movements, stop when it arrives at zero, while the other one is brought around to zero by a farther rotation of the shaft.

Figure 7:
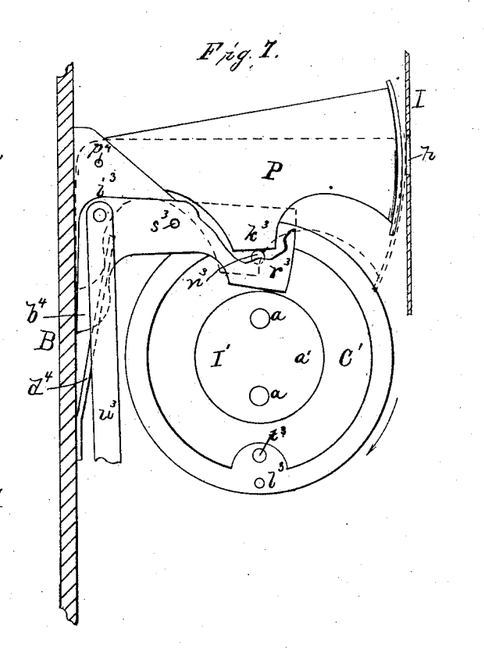
Fig. 7, a similar view of the same, parts being shown in two positions by full and dotted lines.

C' is a wheel placed between the pairs of trip-registering wheels, and having a common axis therewith, the use of which is to operate the plate P, Figs. 1, 3, 5, 6, 7, upon which the words "Up," "Down," &c., appear, causing the proper word to be presented to view through the face-plate. The plate is held by a bracket, $i^3$, secured rigidly to the back plate, B, upon a pivot-pin, $p^4$, in position to swing vertically back of an opening, $h$, in the face-plate I. Upon its lower edge the plate has a projection, $k^3$, in position to be acted upon by pins $l^3$ and $n^3$, projecting from one side of the wheel C', diametrically opposite each other, and at unequal distances from the center thereof. When the wheel is turned so that the outer pin, $l^3$, bears against the projection $k^3$, as shown in Fig. 6, it raises said plate, so that the word "Up," for instance, appears at the opening $h$, but when turned half around, so that the inner pin $n^3$ holds said plate, the latter drops, as shown in Fig. 7, to a position in which the word "Down" appears at the opening; but if the wheel be in such a position that neither pin bears upon the plate the latter will still farther drop and present a blank surface at the opening $h$, and indicate no direction as taken by the car.

The plate is formed with a projection, $c^4$, which, meeting the back plate, B, as said plate P falls, forms a stop to prevent it dropping below a certain position when unsupported by a pin of the wheel C'. A spring, $d^4$, secured to the plate B, in position to press against the projection $c^4$, serves, in addition to gravity, to bring the plate P down. Upon the opposite side the wheel C' is provided with ten equally-spaced pins, $o^3$, similar to those of the trip-wheels, and the shaft H is provided with a single finger, $n$, to engage said pins when said shaft is rotated, as the other fingers, $g$, &c., act upon the other wheels, as above described. The pins $n^3$ and $l^3$ of the wheel C' being opposite each other, said wheel needs to be turned only one-half around in any case where a change is made from "Up" to "Down," or "Down" to "Up," in resetting the apparatus at each end of a trip. In changing these words the shaft H has to be turned through five complete revolutions, and while it is being thus turned the trip-wheels will be set to zero, as above stated—that is to say, as there is a series of ten pins, $o^3$, on the wheel C' and a single arm, $n$, on the shaft H to move them, it requires five revolutions of said shaft to turn the wheel C' through a half-revolution.

Referring to the matter of resetting the parts of the register at the end of a trip, it is sometimes necessary to turn some of the trip-wheels through nearly a complete revolution—as, for instance, when either of them is in position to show the numeral 8 or 9—while the wheel C' needs to be turned but half a revolution to readjust the plate P. On this account it is necessary or convenient to have the pins of the wheel C' acted upon fewer times in the act of resetting the parts than the pins of the trip-wheels. To effect this, I give the wheels C' the same number of pins $o^3$, but omit a finger, $n$, at one side of the shaft H, as shown, so said pins will be acted upon only once at each revolution of the shaft. As the pins of any one of the trip-wheels have never to be acted upon more than nine times (being equal to four and one-half revolutions of the shaft) in any given operation of resetting said wheels, the latter will all be set to zero by the time or before the plate P is adjusted, and in any case the shaft H needs to be turned only with reference to readjusting said plate. The same result could of course be effected by providing the wheel C' with only five pins instead of ten and extending the finger $n$ on both sides of said shaft; also, referring to the matter of exhibiting the words "Up" and "Down," &c., if preferred, the plate P may be dispensed with and said words placed upon the face of the wheel C', at diametrically-opposite points, the opening h in the face-plate being shifted to a position in front of said wheel.

Referring to the matter of irregularly accounting for fares collected, from design the person managing the register might omit to return the trip-wheels fully back to zero at the end of a trip, leaving, for instance, the figure 5 to appear on the units-wheel to apply on the next trip of the vehicle, thus failing to account for the amount of five fares. To prevent this deception, I provide a lock or stop, by means of which no fares can be registered until all the primary wheels are brought truly back to zero and the direction of the trip duly announced at the face of the register by the appearance of the word "Up" or "Down." This is effected as follows:

K', Figs. 1, 2, 6, is a shaft resting in bearing $h^2$, secured to the back plate, B, at the bottom of the case, having extending parts $p^3$ in position to meet the lower ends of the respective bell-cranks O O', as indicated in Fig. 2, serving to prevent their being drawn back by the pull-rods in the act of registering fares.

Normally the parts $p^3$ of the stop lie down against the case in such position that the bell-cranks pass freely over them. To operate the lock or stop K', I use a lever, $r^3$, Fig. 6, pivoted at $s^3$ to the bracket $i^3$, having its front end in position to be acted upon by the pin $n^3$ of the wheel C', and by another similar pin, $t^3$, at the same distance from the axis of the wheel and in line with the pins $t^3$ and $n^3$, above mentioned. A connecting-rod, $w^3$, connects the other end of the lever with the shaft or stop K', and a spring, $v^3$, connected with said shaft and the back plate, tends to pull the parts $p^3$ of the stop up to catch the bell-cranks, as stated. Now it will be seen that when a pin of the wheel C'—as, for instance the pin $t^3$—presses the free end of the lever $r^3$ upward the parts $p^3$ will be forced down against the action of the spring $v^3$, so as to form no obstruction to the movements of the bell-cranks in the act of registering fares; but from the arrangement of the pins $t^3$, $t^3$, and $n^3$, neither pin $t^3$ nor $n^3$ can act upon the lever $r^3$ to hold the stops down without a pin, $t^3$ or $n^3$, at the same time moves the plate P to cause it to expose a word "Up" or "Down." When neither pin is acting upon the lever, the spring is permitted to pull the stop up to meet the bell-cranks, as stated, serving to prevent fares being registered. By this means no fares can be registered without the word indicating the direction of the trip the car is taking is shown at the opening $h$, which enables any observer to detect any irregularity of the nature stated in the matter of registering fares. This locking or stop device serves for both systems of registering-wheels by acting alike upon both of the levers O and O'. The lever $r^3$ is formed with a projecting part, $b^1$, similar to the projection $c^1$ of the plate P, which, coming in contact with the plate B, serves as a stop to prevent said lever falling below a certain position when unsupported by a pin of the wheel C', as stated. The lever O, frame N', with its arm $o'$, the connecting-bar F', for said lever and frame, the hooked arms $k'$, with the springs $n'$, the spring $b$, and a pull-rod, N or L, constitute the actuating mechanism or actuator for one of the systems of registering-wheels in performing the act of registering fares. Outside of the hub of the wheel $d$ and the outer section, $n^2$, of the core I place a plate, $l^1$, to hold the clamping-nuts $f$ of the rods D, said rods piercing said plate. At the opposite ends of the core a similar plate is placed for the same purpose. It is found convenient to provide a simple fastening, $l$, Fig. 1, for the crank P', to hold the shaft H in such position that the fingers thereof shall stand away from the pins of the respective wheels, so as not to interfere with their rotatory movements in the matter of registering fares. The fastening shown is a simple U-shaped piece fitted to turn in a bearing-plate secured to the outer surface of the case. When it is wished to turn the crank, the fastener is turned down flat against the surface of the case, as shown in dotted lines, and when it is wished to hold the crank, for the purpose stated the fastener is turned out at right angles from the case, as shown, a branch of said fastener being on either side of the crank. A catch-pawl, $a^5$, for the wheel C' is provided, its use being the same as that of the similar catch-pawls $a^5$ of the trip-wheels, above described, and being like said catch-pawls, save that it is made slightly shorter.

What I claim as my invention is—

1. In combination with a fixed shaft, a series of revertible number-registering wheels fitted to turn thereon, said wheels each being provided with laterally-projecting pins, a single wheel, C', also turning on said shaft, having a like series of pins, a rotatory shaft having arms to encounter said pins of said respective wheels to turn the latter, the arms encountering the pins of either one of said revertible wheels being twice in number to those encountering the pins of said single wheel, substantially as described.

2. In combination with a fixed shaft, two sets or systems of number-registering wheels fitted to turn thereon, the units-wheels of said respective systems being provided with laterally-projecting pins, hooked arms to engage said pins of the respective units-wheels joined rigidly together, a frame to which said arms are pivoted, a spring to control said frame, a stop for said arms rigid with said frame, springs on said stop to control said arms, and an actuator for said frame, substantially as shown.

3. In combination with a fixed shaft, a series of revertible number-registering wheels fitted to turn thereon, said wheels each being provided with laterally-projecting pins, a single wheel, C', also turning on said shaft, having a like series of pins, a display-disk operated by said single wheel, a rotatory shaft having arms to encounter said pins of said respective wheels to turn the latter, said arms encountering the pins of either one of said revertible wheels being twice in number to those encountering said pins of said single wheel, substantially as and for the purpose shown and described.

4. In combination with a fixed shaft, a series of revertible wheels held to turn thereon, each wheel being provided with a series of pins, a detent-pawl for each of said wheels acting upon said pins to moderately oppose a forward motion of the wheel co-operating therewith and to prevent a backward motion thereof, a rotatory shaft provided with arms to act on said pins of each of said wheels to turn the latter backward, said shaft having other minor extended parts, $g^3$, to lift said respective pawls off the pins of said wheels while said arms of the shaft are acting on said pins to turn said wheels backward, and springs for each of said pawls to control their actions, substantially as shown and described.

5. In combination with the wheels of a passenger-fare-registering device, an actuator for said wheels consisting of the pivoted frame N′, hooked arms $k'$, arm $o'$, lever O, pull-rod N, and a connecting-bar, F′, for said lever and frame, substantially as shown and described.

6. In a passenger-fare-registering device, a rotatory wheel, C′, provided with a series of pins at one side thereof, and other pins, $n^3\ t^3$, a pivoted plate held to be acted upon by said pins $n^3\ t^3$, having characters or words formed thereon, in combination with a rotatory shaft provided with a finger or projection to act upon the pins of said series as said shaft is rotated, substantially as and for the purpose set forth.

7. In a passenger-fare-registering device, a rotatory wheel, C′, provided with a series of pins at one side thereof, and other pins, $n^3\ t^3$, a pivoted lever held in position to be acted upon by said pins $n^3\ t^3$, and joined to the stop K′ by a connecting-bar, and means, substantially as shown, to turn said wheel.

8. In a passenger-fare-registering device, a rotatory wheel, C′, provided with a series of pins at one side thereof, and other pins, $n^3$, $t^3$, and $t^3$, a pivoted plate held to be acted upon by said pins $n^3\ t^3$, having characters or words formed thereon, a lever held in position to be acted upon by said pins $n^3$ and $t^3$, in combination with a stop, K′, said stop being joined to said lever by a connecting-bar, substantially as shown and described.

WM. J. RIGNEY.

Witnesses:
E. B. WHITMORE,
H. B. KNIGHT,